United States Patent
Jaekel et al.

(10) Patent No.: US 12,006,487 B2
(45) Date of Patent: Jun. 11, 2024

(54) PROCESS FOR MAKING A GRANULE OR POWDER

(71) Applicant: BASF SE, Ludwigshafen am Rhein (DE)

(72) Inventors: Frank Jaekel, Ludwigshafen (DE); Astrid Schmidt, Ludwigshafen (DE); Michael Klemens Mueller, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 445 days.

(21) Appl. No.: 17/280,066

(22) PCT Filed: Sep. 16, 2019

(86) PCT No.: PCT/EP2019/074613
§ 371 (c)(1),
(2) Date: Mar. 25, 2021

(87) PCT Pub. No.: WO2020/064379
PCT Pub. Date: Apr. 2, 2020

(65) Prior Publication Data
US 2021/0317392 A1    Oct. 14, 2021

(30) Foreign Application Priority Data
Sep. 27, 2018 (EP) .................................. 18197041

(51) Int. Cl.
| | | |
|---|---|---|
| C11D 1/04 | (2006.01) | |
| B01J 2/04 | (2006.01) | |
| B01J 2/16 | (2006.01) | |
| C11D 3/20 | (2006.01) | |
| C11D 3/33 | (2006.01) | |
| C11D 3/39 | (2006.01) | |
| C11D 11/00 | (2006.01) | |
| C11D 17/06 | (2006.01) | |

(52) U.S. Cl.
CPC ............ *C11D 11/0082* (2013.01); *B01J 2/04* (2013.01); *B01J 2/16* (2013.01); *C11D 1/04* (2013.01); *C11D 3/33* (2013.01); *C11D 3/3942* (2013.01); *C11D 17/06* (2013.01)

(58) Field of Classification Search
CPC .............. C11D 1/04; C11D 3/33; C11D 17/06
USPC ................ 510/477, 480, 488, 499, 452, 445
See application file for complete search history.

(56) References Cited

U.S. PATENT DOCUMENTS

| | | | |
|---|---|---|---|
| 8,754,026 B2 | 6/2014 | Blei et al. | |
| 10,240,113 B2* | 3/2019 | Heppert | ................. C11D 3/221 |
| 2003/0144161 A1* | 7/2003 | Beers | ..................... A61Q 19/10 |
| | | | 510/130 |
| 2011/0054215 A1* | 3/2011 | Euser | ...................... C11D 3/33 |
| | | | 562/571 |
| 2013/0000370 A1* | 1/2013 | Lang | ....................... C11D 7/20 |
| | | | 977/788 |
| 2017/0175056 A1* | 6/2017 | Watson | ................ C11D 3/3917 |
| 2017/0321169 A1* | 11/2017 | Tang | ................... C11D 11/0017 |

FOREIGN PATENT DOCUMENTS

| | | | | |
|---|---|---|---|---|
| CN | 1333810 A | | 1/2002 | |
| CN | 105980538 A | | 9/2016 | |
| EP | 2103678 A1 * | | 9/2009 | ............... C11D 1/37 |
| EP | 2399981 A1 * | | 12/2011 | ............. C08J 3/126 |
| WO | WO-2007020608 A1 * | | 2/2007 | ............. C11D 11/02 |
| WO | 2009103822 A1 | | 8/2009 | |
| WO | 2012041741 A1 | | 4/2012 | |
| WO | 2012168739 A1 | | 12/2012 | |
| WO | WO-2014090573 A1 * | | 6/2014 | ......... C11D 3/38618 |
| WO | WO-2015121170 A1 * | | 8/2015 | ......... C11D 11/0017 |
| WO | WO-2016077649 A1 * | | 5/2016 | ............... A61N 1/05 |
| WO | WO-2017220308 A1 * | | 12/2017 | ........... C07C 227/00 |
| WO | WO-2018011027 A1 * | | 1/2018 | ........... C07C 227/36 |

OTHER PUBLICATIONS

European Search Report for EP Patent Application No. 18197041.9, dated Mar. 29, 2019, pp. 1-3.
International Search Report issued in PCT/EP2019/074613 dated Dec. 17, 2019, pp. 1-2.

* cited by examiner

*Primary Examiner* — Gregory R Delcotto
(74) *Attorney, Agent, or Firm* — ArentFox Schiff LLP

(57) ABSTRACT

Process for making a powder or granule containing
(A) at least one chelating agent selected from alkali metal salts of methyl glycine diacetic acid (MGDA) and of glutamic acid diacetate (GLDA) and of iminodisuccinic acid (IDS),
(B) at least one alkali metal salt of a $C_{10}$-$C_{20}$ fatty acid,
in a weight ratio of (A):(B) of from 40:1 up to 1,000:1,
wherein said powder or granule contains at least 75% by weight of chelating agent (A),
said process comprising the steps of
(c) mixing the at least one chelating agent (A) and the at least one alkali metal salt of fatty acid (B) in the presence of water,
(d) removing most of said water by spray-drying or by spray granulation using a gas with an inlet temperature of at least 125° C.

9 Claims, No Drawings

PROCESS FOR MAKING A GRANULE OR POWDER

CROSS-REFERENCE TO RELATED APPLICATIONS

This application is a National Stage Entry of PCT/EP2019/074613, filed Sep. 16, 2019, which claims priority to EP application No. 18197041.9, filed Sep. 27, 2018, the disclosures of each of which are hereby incorporated by reference in their entireties.

The present invention is directed towards a process for making a powder or granule containing (A) at least one chelating agent selected from alkali metal salts of methyl glycine diacetic acid (MGDA) and of glutamic acid diacetate (GLDA) and of iminodisuccinic acid (IDS),
(B) at least one alkali metal salt of a $C_{10}$-$C_{20}$ fatty acid, in a weight ratio of (A):(B) of from 40:1 up to 1,000:1, wherein said powder or granule contains at least 75% by weight of chelating agent (A), said process comprising the steps of
(a) mixing the at least one chelating agent (A) and the at least one alkali metal salt of fatty acid (B) in the presence of water,
(b) removing most of said water by spray-granulation in a fluidized bed or by spray-drying using a gas with an inlet temperature of at least 125° C.

Chelating agents of the aminocarboxylate type such as methyl glycine diacetic acid (MGDA) and glutamic acid diacetic acid (GLDA) and their respective alkali metal salts are useful sequestrants for alkaline earth metal ions such as $Ca^{2+}$ and $Mg^{2+}$. A lot of aminocarboxylates show good biodegradability and are thus environmentally friendly. For that reason, they are recommended and used for various purposes such as laundry detergents and for automatic dishwashing (ADW) formulations, in particular for so-called phosphate-free laundry detergents and phosphate-free ADW formulations.

Depending on the type of product—liquid home care and fabric care products versus solid home care and fabric care products—and the manufacturing process of solid home care and fabric care products care product manufacturers may either prefer to handle solutions of aminocarboxylates or solid arminocarboxylates, for example joint spray drying or solid mixing. Powders and granules of aminocarboxylates may be shipped economically due to their high active ingredient content that goes along with low water content. Therefore, convenient processes for providing granules are still of great commercial interest.

In WO 2009/103822, a process is disclosed in which slurries are granulated that have a certain solids content, with a gas inlet temperature of 120° C. or less.

In WO 2012/168739, a process is disclosed wherein slurries of complexing agents are spray-dried under non-agglomerating conditions.

In WO 2012/041741, a process is disclosed wherein solutions of complexing agents are dried using a spouted bed. However, up-scaling of spouted bed reactions is difficult.

Commonly ADW formulations contain up to 40% of MGDA builder and are packaged in single unit doses, in brief also "SUD". The space in these SUD is limited and thus a higher bulk density is desired, because a higher bulk density allows for more active product per volume unit in these SUDs.

It was therefore an objective of the present invention to provide a process that yields powders or granules of chelating agents with an increased bulk density. It was also an objective of the present invention to provide powders or granules of chelating agents with an increased bulk density.

Accordingly, the process defined at the outset has been found, hereinafter also referred to as inventive process or as process according to the present invention. The inventive process comprises several steps that may be referred to as step (a) or step (b) etc. and that will be explained in more detail below.

The inventive process is a process for making a powder or granule, said powders and granules also being referred to as inventive powders and inventive granules, respectively. In the context of the present invention, the term "powder" refers to particulate materials that are solids at ambient temperature and that preferably have an average particle diameter in the range of from 30 µm to less than 0.1 mm, preferably 30 µm up to 75 µm. The average particle diameter of inventive powders can be determined, e.g., by LASER diffraction methods, for example with Malvern apparatus, and refers to the volume average.

The term "granule" in the context of the present invention refers to particulate materials that are solids at ambient temperature and that preferably have an average particle diameter (D50) in the range of from 0.1 mm to 2 mm, preferably 0.4 mm to 1.25 mm, even more preferably 400 µm to 1 mm. The average particle diameter of inventive granules can be determined, e.g., by optical or preferably by sieving methods. Sieves employed may have a mesh in the range of from 60 to 3,000 µm.

In one embodiment of the present invention, inventive powders or inventive granules have a broad particle diameter distribution. In another embodiment of the present invention, inventive powders or inventive granules have a narrow particle diameter distribution. The particle diameter distribution can be adjusted, if desired, by multiple sieving steps.

Granules and powders made by the inventive process may contain residual moisture, moisture referring to water including water of crystallization and adsorbed water. The amount of water may be in the range of from 0.1 to 20% by weight, preferably 1 to 15% by weight, referring to the total solids content of the respective powder or granule, and may be determined by Karl-Fischer-titration or by drying at 160 to 200° C. to constant weight with infrared light.

Particles of powders and granules made by the inventive process may have regular or irregular shape. Preferred shapes of particles of powders and of granules made by the inventive process are spheroidal shapes.

Particles of powders or granules made by the inventive process contain at least one chelating agent, hereinafter also referred to as chelating agent (A). Chelating agent (A) is selected from alkali metal salts of methyl glycine diacetic acid (MGDA) and glutamic acid diacetate (GLDA) and iminodisuccinic acid (IDS).

Alkali metals of MGDA are selected from compounds according to general formula (I a)

$$[CH_3-CH(COO)-N(CH_2-COO)_2]M_{3-x}H_x \qquad (I\ a)$$

wherein

M is selected from alkali metal cations, same or different, for example cations of lithium, sodium, potassium, rubidium, cesium, and combinations of at least two of the foregoing. Preferred examples of alkali metal cations are sodium and potassium and combinations of sodium and potassium.

x in formula (I a) is in the range of from zero to 1.0, preferred are zero to 0.5. In a particularly preferred embodiment, x is zero.

Alkali metals of GLDA are selected from compounds according to general formula (I b)

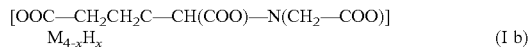

wherein

M is selected from alkali metal cations, same or different, as defined above, x in formula (I b) is in the range of from zero to 2.0, preferred are zero to 0.5. In a particularly preferred embodiment, x is zero.

Alkali metals of IDS are selected from compounds according to general formula (I c)

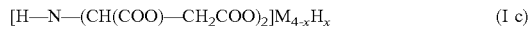

wherein

M is selected from alkali metal cations, same or different, as defined above, x in formula (I c) is in the range of from zero to 2.0, preferred are zero to 0.5. In a particularly preferred embodiment, x is zero.

In one embodiment of the present invention, alkali metal salts of MGDA are selected from lithium salts, potassium salts and preferably sodium salts of MGDA. MGDA can be partially or preferably fully neutralized with the respective alkali. In a preferred embodiment, an average of from 2.7 to three COOH groups of MGDA is neutralized with alkali metal, preferably with sodium. In a particularly preferred embodiment, chelating agent (A) is the trisodium salt of MGDA.

MGDA and its respective alkali metal salts are selected from the racemic mixtures, the D-isomers and the L-isomers, and from mixtures of the D- and L-isomers other than the racemic mixtures. Preferably, MGDA and its respective alkali metal salts are selected from the racemic mixture and from mixtures containing in the range of from 55 to 85 mole-% of the L-isomer, the balance being D-isomer. Particularly preferred are mixtures containing in the range of from 60 to 80 mole-% of the L-isomer, the balance being D-isomer. Other particularly preferred embodiments are racemic mixtures.

GLDA and its respective alkali metal salts are selected from the racemic mixtures, the D-isomers and the L-isomers, and from mixtures of the D- and L-isomers other than the racemic mixtures. Preferably, GLDA and its respective alkali metal salts are selected from the racemic mixture and from mixtures containing in the range of from 55 to 99 mole-% of the L-isomer, the balance being D-isomer. Particularly preferred are mixtures containing in the range of from 60 to 98.5 mole-% of the L-isomer, the balance being D-isomer. Other particularly preferred embodiments are racemic mixtures.

IDS and its respective alkali metal salts are selected from various mixtures of isomers, for example D,D-IDS, L,L-IDS and D,L-IDS and combinations therefrom. Preferred are optically inactive mixtures since they are cheaper to be manufactured.

In any way, minor amounts of chelating agent (A) may bear a cation other than alkali metal. It is thus possible that minor amounts, such as 0.01 to 5 mol-% of total MGDA, GLDA or IDS, respectively, bear alkali earth metal cations such as $Mg^{2+}$ or $Ca^{2+}$, or an $Fe^{2+}$ or $Fe^{3+}$ cation.

In one embodiment of the present invention, alkali metal salt of chelating agent (A) may contain one or more impurities that may result from the synthesis of the respective chelating agent (A). In the cases of MGDA and GLDA and their alkali metal salts, such impurities may be selected from propionic acid, lactic acid, alanine, nitrilotriacetic acid (NTA) or the like and their respective alkali metal salts. In the case of IDS, such impurities may be selected from maleic acid, monoamides of maleic/fumaric acid, and racemic asparagine. Such impurities are usually present in minor amounts. "Minor amounts" in this context refer to a total of 0.1 to 5% by weight, referring to alkali metal salt of chelating agent (A), preferably up to 2.5% by weight. In the context of the present invention, such minor amounts are neglected when determining the composition of granule made according to the inventive process.

In a special embodiment of the present invention, a combination alkali metal salts of at least two different chelating agents is used, for example sodium salts of MGDA and GLDA in a weight ratio of from 1:1 to 5:1. In other embodiments, alkali metal salts of only one chelating agent is used, in particular sodium metal salts of MGDA.

Particles of powders or granules made by the inventive process further contain (B) at least one alkali metal salt of a $C_{10}$-$C_{20}$ fatty acid, hereinafter also referred to as fatty acid salt (B) or salt of fatty acid (B). Alkali metal cations may be selected from lithium, sodium, and potassium with potassium and sodium being preferred and sodium being even more preferred.

$C_{10}$-$C_{20}$ fatty acids may be saturated or bear one or more $C{=}C$— double bonds, the residues at such bonds preferably being in the (Z)-position. Preferred examples of suitable fatty acids are those whose molecules bear an even number of C-atoms. Many fatty acids obtained from natural sources are mixtures, for example mixtures of n-$C_{10}$-carboxylic acid and n-$C_{12}$-carboxylic acid and n-$C_{14}$-carboxylic acid, and in the context of the present invention they may be named after the main component or main components.

Examples of suitable fatty acid salts (B) are the potassium salts and the sodium salts of decanoic acid, lauric acid, myristic acid, palmitic acid, stearic acid, and arachidic acid, and combinations of at least two of the foregoing. Preferred examples of suitable fatty acid salts (B) are those that bear at least one C═C double bond per molecule, for example myristoleic acid, palmitoleic acid, sapienic acid, leaidic acid, petroselinic acid, vaccenic acid, linoleic acid, linoelaidic acid, acid, palmitoleic acid, and α-linolenic acid, and combinations of at least two of the foregoing. More preferred are the sodium and potassium salts of oleic acid, linoleic acid, palmitoleic acid, and α-linolenic acid. Even more preferred are the sodium salts of oleic acid, linoleic acid, palmitoleic acid, and of α-linolenic acid.

The weight ratio of (A):(B) is in the range of from 40:1 up to 1,000:1, preferably 50:1 to 150:1. In this weight ratio, impurities of chelating agent (A) that stem from the synthesis, see above, are neglected.

Particles of powders or granules made by the inventive process contain at least 75% by weight of chelating agent (A). The contents of chelating agent (A) may be determined, e.g., by potentiometric titration with $FeCl_3$. The percentage refers to the solids content of said powder or granule and may be determined by Karl-Fischer titration or by drying at 160 to 200° C. to constant weight with infrared light. It excludes crystal water.

Granules and powders made by the inventive process may contain residual moisture, moisture referring to water including water of crystallization and adsorbed water. The amount of water may be in the range of from 0.1 to 20% by weight, preferably 1 to 15% by weight, referring to the total solids content of the respective powder or granule, and may be determined by Karl-Fischer-titration or by drying at 160 to 200° C. to constant weight with infrared light.

The inventive process comprises steps (a) and (b),
(a) mixing the at least one chelating agent (A) and the at least one alkali metal salt of fatty acid (B) in the presence of water,
(b) removing most of said water by spray-drying or by spray granulation using a gas with an inlet temperature of at least 125° C.

hereinafter also referred to as step (a) and step (b). Usually, step (b) is performed simultaneously with or after step (a). Step (a) and step (b) will be described in more detail below.

Mixing of chelating agent (A) and fatty acid salt (B) is usually performed in the presence of water. Said mixing can be conducted in a way that an aqueous solution of fatty acid salt (B) and an aqueous solution of chelating agent (A) are being combined in a vessel, preferably under vigorous stirring. It is also possible to combine an aqueous solution of fatty acid salt (B) and solid chelating agent (A), or to combine an aqueous solution of chelating agent (A) with solid fatty acid salt (B), or to combine aqueous slurries of chelating agent (A) and fatty acid salt (B) and then dilute it with water. In an alternative embodiment, water is provided and subsequently, fatty acid salt (B) and then chelating agent (A) are added. In a preferred embodiment, a solution of chelating agent (A) is provided that has a temperature of 35 to 50° C., and fatty acid salt (B) is being added, either in bulk or as solution.

In one embodiment of the present invention, mixing according to step (a) is performed in a nozzle, for example a three-fluid nozzle, immediately before or simultaneously with step (b).

The resultant aqueous formulation is preferably in the form of an emulsion or microemulsion.

Step (a) can be performed at ambient temperature. In other embodiments, step (a) is being performed at 20° C. or at elevated temperature, for example at a temperature in the range of from 25 to 90° C., preferably 60 to 75° C.

The water used in step (a) may be present in an amount that both chelating agent (A) and fatty acid salt (B) are dissolved. However, it is also possible to use less amounts of water and mix chelating agent (A) and fatty acid salt (B) in a way that a slurry is being formed, with the continuous phase having the appearance of a solution or an emulsion.

In one embodiment of the present invention, the total solids content of such solution or slurry formed as result of step (a) is in the range of from 20 to 75%, preferably 35 to 50%.

In one embodiment of the present invention, such solution or slurry has a pH value in the range of from 2.5 to 13, preferably from 7 to 13 and even more preferably at least 8.

Mixing may be performed with mechanical support, for example shaking or stirring.

In step (b), a spray-drying or spray granulation is performed, using a gas with an inlet temperature of at least 125° C. Said gas, hereinafter also being referred to as "hot gas", may be nitrogen, a rare gas or preferably air. In the course of step (b), most of the water used in step (a) will be removed, for example at least 55%, preferably at least 65% of the water. In one embodiment of the present invention, 99% of the water at most will be removed.

Spray-drying and spray granulation will be described in more detail below.

The aqueous slurry or aqueous solution according to step (a) may have a temperature in the range of from 15 to 95° C., preferably 20 to 90° C. and even more preferably 50 to 90° C.

In step (b), said aqueous slurry or aqueous solution is introduced into a spray tower or spray granulator. In the context of the present invention, a spray granulator usually contains a fluidized bed, in the context of the present invention it is a fluidized bed of chelating agent (A), or of inventive granule. Such fluidized bed of chelating agent (A) is preferably in the form of chelating agent in crystalline form, for example at least 66% crystalline form, determined by X-Ray diffraction. In one embodiment of the present invention, the fluidized bed may have a temperature in the range of from 75 to 150° C., preferably 80 to 110° C. Spray towers usually do not contain any fluidized bed.

Spraying is being performed through one or more nozzles per spray tower or spray granulator. Suitable nozzles are, for example, high-pressure rotary drum atomizers, rotary atomizers, three-fluid nozzles, single-fluid nozzles, three-fluid nozzles and two-fluid nozzles, single-fluid nozzles and two-fluid nozzles and three-fluid nozzles being preferred. The first fluid is the aqueous slurry or aqueous solution or emulsion, respectively, the second fluid is compressed hot gas, also referred to as hot gas inlet stream, for example with a pressure of 1.1 to 7 bar. The hot gas inlet stream may have a temperature in the range of from at least 125° C. to 250° C., preferably 150 to 250° C., even more preferably 160 to 220° C.

In step (b), the aqueous slurry or aqueous solution of complexing agent (A) and salt of fatty acid (B) is introduced in the form of droplets. In one embodiment of the present invention, the droplets formed during the spray-granulating or spray-drying have an average diameter in the range of from 10 to 500 µm, preferably from 20 to 180 µm, even more preferably from 30 to 100 µm.

In one embodiment of the present invention, the off-gas departing the spray tower or spray granulator, respectively, may have a temperature in the range of from 40 to 140° C., preferably 80 to 110° C. but in any way colder than the hot gas stream. Preferably, the temperature of the off-gas departing the drying vessel and the temperature of the solid product present in the drying vessel are identical.

In one embodiment of the present invention, the pressure in the spray tower or spray granulator in step (b) is normal pressure±100 mbar, preferably normal pressure±20 mbar, for example one mbar less than normal pressure.

In one embodiment of the present invention, especially in a process for making an inventive granule, the average residence time of chelating agent (A) in step (b) is in the range of from 2 minutes to 4 hours, preferably from 30 minutes to 2 hours.

In another embodiment of the present invention, spray-granulation is being performed by performing two or more consecutive spray-drying processes, for example in a cascade of at least two spray dryers, for example in a cascade of at least two consecutive spray towers or a combination of a spray tower and a spray chamber, said spray chamber containing a fluidized bed. In the first dryer, a spray-drying process is being performed in the way as follows.

Spray-drying may be preferred in a spray dryer, for example a spray chamber or a spray tower. An aqueous slurry or solution with a temperature preferably higher than ambient temperature, for example in the range of from 50 to 95° C. is introduced into the spray dryer through one or more spray nozzles into a hot gas inlet stream, for example nitrogen or air, the solution or slurry being converted into droplets and the water being vaporized. The hot gas inlet stream may have a temperature in the range of from 125 to 350° C. The second spray dryer is charged with a fluidized bed with solid from the first spray dryer and solution or slurry obtained according to the above step is sprayed onto or into the fluidized bed, together with a hot gas inlet stream. The hot gas inlet stream may have a temperature in the range of from 125 to 350° C., preferably 160 to 220° C.

In embodiments wherein an aged slurry is used, such aging may take in the range of from 2 hours to 24 hours at the temperature preferably higher than ambient temperature.

In the course of step (b), most of the water is removed. Most of the water shall mean that a residual moisture content of 0.1 to 20% by weight, referring to the powder or granule, remains. in embodiments that start of from a solution, about 51 to 75% by weight of the water present in the aqueous solution is removed in step (b).

A powder or granule is obtained.

In one embodiment of the inventive process, the inventive process may contain further steps, for example separating off fines or lumps, milling down lumps, and/or returning fines and milled down lumps into the inventive process, for example by directly returning them into a spray granulator—or dissolving them in water and then spray-drying.

Such optional additional steps are hereinafter also referred to step (c), and they are briefly discussed hereinafter.

At the end of step (b), powder or granule, respectively, is removed from the spray tower or spray granulator. Said powder or granule has been at least partially formed in the course of step (b) of the inventive process. Said removal may be performed through one or more openings in the spray tower or spray granulator. Preferably, such one or more openings are at the bottom of the respective spray tower or spray granulator. Powder or granules, respectively, are removed including fines and lumps.

In embodiments in which a powder is made preferably 70 to 95% by weight of the solid formed are withdrawn from the spray tower per hour. In embodiments in which a granule is made, 20 to 60% of the fluidized bed are withdrawn per hour, for example with an extruder screw. Additional solids, especially fines, may be collected in the off-gas purification.

In one embodiment of the inventive process, in the course of step (c) fines may be separated off from said powder or granules, wherein said fines have a maximum particle diameter of 350 µm. Preferably, fines in processes wherein granules are desired may have a particles diameter in the range of from 1 to 150 µm. The act of separating off the fines may be performed by sieving or by air classification, preferably by sieving.

In embodiments wherein spray-drying is performed, fines have a particles diameter of 30 µm or less, for example 1 to 30 µm.

In one embodiment of the present invention, in step (b) 40 to 100% of the fines present in the respective material withdrawn at the end of step (b) are separated off. In a preferred embodiment, in step (c) 80 to 99% by weight of the fines are separated off, and the residual 1 to 20% are left in the respective powder or granule. It is tedious to try to remove the fines quantitatively.

In step (c) of the inventive process, so-called lumps or "overs" may be separated off from said powder or granules.

In embodiments wherein granules are desired, said lumps to be separated off are particles that have a minimum particle diameter of 1,000 µm, for example, 1,500 µm to 2 mm or even more. In a preferred embodiment, lumps are particles that have a minimum particle diameter of 1,250 µm or more, even more preferably 900 µm to 2 mm.

In embodiments wherein powders are desired, said lumps or overs have a minimum particle diameter of 250 µm or more, for example 250 to 1,000 µm.

Overs or lumps may be removed, e.g., with the help of a discharge screw or a rotary valve, usually together with desired product, and then classified.

It is observed that in connection with the recycling, the smaller the maximum size of the lumps to be separated off in step (c) the better the hygroscopicity behavior of the later chelating agent, and the better the peroxide stability.

Separating off lumps and fines may be performed in any order, consecutively or simultaneously.

In one embodiment of the present invention, the amount of powder or granule, respectively, other than fines and overs is in the range of from 55 to 70% by weight, referring to total amount of material removed at the end of step (b).

The lumps separated of in step (c) may be milled down to a smaller size, for example to maximum particle diameter of 500 µm, preferably to a maximum particle diameter of 400 µm. The milling may be performed in any type of mills. Examples of particularly useful mills are jet mills, pin mills and bolting machines (German: Stiftmühlen). Further examples are roller mills and ball mills.

In one embodiment, said fines from step (c) and milled lumps from step (c) are reintroduced into a spray-dryer or spray-granulator. Such reintroducing may be performed by pneumatically transporting said fines milled lumps from step (c) into the spray tower or spray granulator, respectively, preferably through an extra opening rather than together with solution or slurry from step (a).

The share of fines withdrawn in step (c) may be in the range of from 0.5 to 20% by weight of the total chelating agent (A) withdrawn in step (b), preferably 4 to 18% by weight. The share of lumps is in the range of from 5 to 60% by weight of the total chelating agent (A) withdrawn in step (b), preferably 20 to 40% by weight and even more preferably 25 to 35% by weight. With a higher share of lumps, the inventive process becomes economically unfavorable because it is too much recycling. With a lower share of lumps the hygroscopicity may become too high.

By performing the inventive process, powders and granules may be obtained. Such powders and granules have a particularly high bulk density (German: Schüttdichte), for example 800 to 950 g/l, preferably 850 to 920 g/l and more preferably 875 to 910 g/l, determined according to DIN ISO 697-1984-01.

A further aspect of the present invention is related to granules and powders, hereinafter also referred to as inventive granules and inventive powders, respectively. Inventive powders and inventive granules contain (A) at least one chelating agent selected from methyl glycine diacetic acid (MGDA) and glutamic acid diacetate (GLDA) and iminodisuccinic acid (IDS) and their respective alkali metal salts, (B) at least one alkali metal salt of a $C_{10}$-$C_{20}$ fatty acid, in molecularly disperse form, in a weight ratio of (A):(B) of from 40:1 up to 1,000:1, wherein said powder or granule contains at least 75% by weight of chelating agent (A), the percentage referring to the solids content of said powder or granule.

In the context of the present invention, the term "in molecularly disperse form" implies that all or a vast majority, for example at least 80% of the particles of inventive powder and of inventive granules contain chelating agent (A) and salt of fatty acid (B). The term "in molecularly disperse form" implies as well that chelating agent (A) and salt of fatty acid (B) are distributed over the diameter of the particle in an almost homogeneous way.

In a preferred embodiment of the present invention, the weight ratio of (A)/(B) is in the range of from 50:1 to 150:1. In this weight ratio, impurities of chelating agent (A) that stem from the synthesis, see above, are neglected.

In one embodiment of the present invention, inventive powders are selected from powders having an average particle diameter in the range of from 1 μm to less than 0.1 mm.

In one embodiment of the present invention, inventive granules are selected from granules with an average particle diameter in the range of from 0.1 mm to 2 mm, preferably 0.75 mm to 1.25 mm.

In one embodiment of the present invention, inventive powder or inventive granule contains in the range of from 98 to 99.9% by weight chelating agent (A) and 0.1 to 2% by weight salt of fatty acid (B), percentages referring to the solids content of said powder or granule.

Inventive powders and inventive granules exhibit overall advantageous properties including but not limited to an excellent yellowing behavior, especially in the presence of bleaching agents. They are therefore excellently suitable for the manufacture of cleaning agents that contain at least one bleaching agent, such cleaning agent hereinafter also being referred to as bleach. In particular inventive powders and inventive granules are suitable for the manufacture cleaning agent for fibers or hard surfaces wherein said cleaning agent contains at least one peroxy compound.

Inventive granules and especially inventive powders may easily be converted into compactates and into agglomerates.

Another aspect of the present invention is therefore the use of an inventive powder or an inventive granule according for the manufacture of a cleaning agent that may contain at least one bleaching agent, and in particular for the manufacture of cleaning agent for fibers or hard surfaces, wherein said cleaning agent contains at least one peroxy compound. Another aspect of the present invention is a process for making at a cleaning agent by combining at least one inventive powder or at least one inventive granule with at least one bleaching agent, preferably at least one peroxy compound. Another aspect of the present invention is a cleaning agent, hereinafter also being referred to as inventive cleaning agent.

Inventive cleaning agents may contain at least one bleaching agent and at least one inventive powder or at least one inventive granule. Inventive cleaning agents show a reduced tendency for yellowing and therefore have an extended shelve-life.

Examples of suitable peroxy compounds are sodium perborate, anhydrous or for example as monohydrate or as tetrahydrate or so-called dihydrate, sodium percarbonate, anhydrous or, for example, as monohydrate, hydrogen peroxide, persulfates, organic peracids such as peroxylauric acid, peroxystearic acid, peroxy-α-naphthoic acid, 1,12-diperoxydodecanedioic acid, perbenzoic acid, peroxylauric acid, 1,9-diperoxyazelaic acid, diperoxyisophthalic acid, in each case as free acid or as alkali metal salt, in particular as sodium salt, also sulfonylperoxy acids and cationic peroxy acids.

In a preferred embodiment, peroxy compound is selected from inorganic percarbonates, persulfates and perborates. Examples of sodium percarbonates are 2 $Na_2CO_3 \cdot 3H_2O_2$. Examples of sodium perborate are $(Na_2[B(OH)_2(O_2)]_2)$, sometimes written as $NaBO_2 \cdot O_2 \cdot 3H_2O$ instead. Most preferred peroxy compound is sodium percarbonate.

The term "cleaning agents" includes compositions for dishwashing, especially hand dishwash and automatic dishwashing and ware-washing, and compositions for hard surface cleaning such as, but not limited to compositions for bathroom cleaning, kitchen cleaning, floor cleaning, descaling of pipes, window cleaning, car cleaning including truck cleaning, furthermore, open plant cleaning, cleaning-in-place, metal cleaning, disinfectant cleaning, farm cleaning, high pressure cleaning, and in addition, laundry detergent compositions.

Such cleaning agents may be liquids, gels or preferably solids at ambient temperature, solids cleaning agents being preferred. They may be in the form of a powder or in the form of a unit dose, for example as a tablet.

In one embodiment of the present invention, inventive cleaning agents may contain in the range of from 2 to 50% by weight of inventive powder or inventive granule, in the range of from 0.5 to 15% by weight of bleach.

Percentages are based on the solids content of the respective inventive cleaning agent.

Inventive cleaning agents may contain further ingredients such as one or more surfactants that may be selected from non-ionic, zwitterionic, cationic, and anionic surfactants. Other ingredients that may be contained in inventive cleaning agents may be selected from bleach activators, bleach catalysts, corrosion inhibitors, sequestering agents other than chelating agent (A), enzymes, fragrances, dyestuffs, antifoams, and builders.

Particularly advantageous inventive cleaning agents may contain one or more complexing agents other than MGDA or GLDA. Advantageous detergent compositions for cleaners and advantageous laundry detergent compositions may contain one or more sequestrant (chelating agent) other than a mixture according to the present invention. Examples for sequestrants other than a mixture according to the present invention are IDS (iminodisuccinate), citrate, phosphonic acid derivatives, for example the disodium salt of hydroxyethane-1,1-diphosphonic acid ("HEDP"), and polymers with complexing groups like, for example, polyethyleneimine in which 20 to 90 mole-% of the N-atoms bear at least one $CH_2COO^-$ group, and their respective alkali metal salts, especially their sodium salts, for example $IDS-Na_4$, and trisodium citrate, and phosphates such as STPP (sodium tripolyphosphate). Due to the fact that phosphates raise environmental concerns, it is preferred that advantageous inventive cleaning agents are free from phosphate. "Free from phosphate" should be understood in the context of the present invention, as meaning that the content of phosphate and polyphosphate is in sum in the range from 10 ppm to 0.2% by weight, determined by gravimetric methods and referring to the respective inventive cleaning agent.

Inventive cleaning agents may contain one or more surfactant, preferably one or more non-ionic surfactant.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (I)

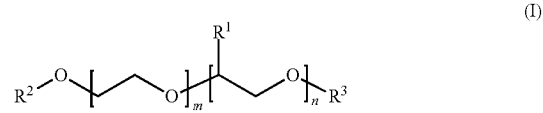

(I)

in which the variables are defined as follows:
R¹ is identical or different and selected from hydrogen and linear $C_1$-$C_{10}$-alkyl, preferably in each case identical and ethyl and particularly preferably hydrogen or methyl,
R² is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
R³ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, m and n are in the range from zero to 300, where the sum of n and m is at least one, preferably in the range of from 3 to 50. Preferably, m is in the range from 1 to 100 and n is in the range from 0 to 30.

In one embodiment, compounds of the general formula (I) may be block copolymers or random copolymers, preference being given to block copolymers.

Other preferred examples of alkoxylated alcohols are, for example, compounds of the general formula (II)

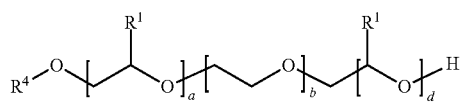

(II)

in which the variables are defined as follows:
R¹ is identical or different and selected from hydrogen and linear $C_1$-$C_9$-alkyl, preferably identical in each case and ethyl and particularly preferably hydrogen or methyl,
R⁴ is selected from $C_6$-$C_{20}$-alkyl, branched or linear, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$,
a is a number in the range from zero to 10, preferably from 1 to 6,
b is a number in the range from 1 to 80, preferably from 4 to 20,
d is a number in the range from zero to 50, preferably 4 to 25.

The sum a+b+d is preferably in the range of from 5 to 100, even more preferably in the range of from 9 to 50.

Preferred examples for hydroxyalkyl mixed ethers are compounds of the general formula (III)

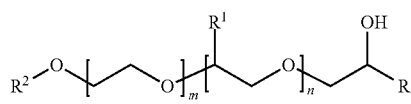

(III)

in which the variables are defined as follows:
R¹ is identical or different and selected from hydrogen and linear $C_1$-$C_{10}$-alkyl, preferably in each case identical and ethyl and particularly preferably hydrogen or methyl,
R² is selected from $C_8$-$C_{22}$-alkyl, branched or linear, for example iso-$C_{11}H_{23}$, iso-$C_{13}H_{27}$, n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
R³ is selected from $C_1$-$C_{18}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, isodecyl, n-dodecyl, n-tetradecyl, n-hexadecyl, and n-octadecyl.

The variables m and n are in the range from zero to 300, where the sum of n and m is at least one, preferably in the range of from 5 to 50. Preferably, m is in the range from 1 to 100 and n is in the range from 0 to 30.

Compounds of the general formula (II) and (III) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglucosides and branched $C_8$-$C_{14}$-alkyl polyglycosides such as compounds of general average formula (IV) are likewise suitable.

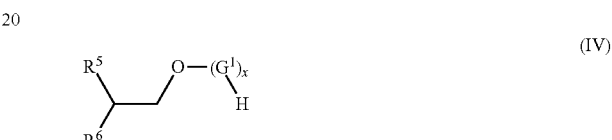

(IV)

wherein the variables are defined as follows:
R⁵ is $C_1$-$C_4$-alkyl, in particular ethyl, n-propyl or isopropyl,
R⁶ is —$(CH_2)_2$—R⁵,
G¹ is selected from monosaccharides with 4 to 6 carbon atoms, especially from glucose and xylose,
x in the range of from 1.1 to 4, x being an average number.

An overview of suitable further nonionic surfactants can be found in EP-A 0 851 023 and in DEA 198 19 187.

Mixtures of two or more different nonionic surfactants may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (V)

$R^7R^8R^9N{\rightarrow}O$ (V)

wherein $R^7$, $R^8$ and $R^9$ are selected independently from each other from aliphatic, cycloaliphatic or $C_2$-$C_4$-alkylene $C_{10}$-$C_{20}$-alkylamido moieties. Preferably, $R^7$ is selected from $C_8$-$C_{20}$-alkyl or $C_2$-$C_4$-alkylene $C_{10}$-$C_{20}$-alkylamido and $R^8$ and $R^9$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

Examples of suitable anionic surfactants are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples for suitable anionic surfactants are soaps, for example the sodium or potassium salts of stearoic acid, oleic acid, palmitic acid, ether carboxylates, and alkylether phosphates.

Preferably, laundry detergent compositions contain at least one anionic surfactant.

In one embodiment of the present invention, inventive cleaning agents that are determined to be used as laundry detergent compositions may contain 0.1 to 60% by weight of at least one surfactant, selected from anionic surfactants, amphoteric surfactants and amine oxide surfactants.

In one embodiment of the present invention, inventive cleaning agents that are determined to be used for hard surface cleaning may contain 0.1 to 60% by weight of at least one surfactant, selected from anionic surfactants, amphoteric surfactants and amine oxide surfactants.

In a preferred embodiment, inventive cleaning agents do not contain any anionic detergent.

Inventive cleaning agents may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Inventive cleaning agents may comprise one or more bleach activators, for example N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Inventive cleaning agents may comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, inventive cleaning agents comprise in total in the range from 0.1 to 1.5% by weight of corrosion inhibitor.

Inventive cleaning agents may comprise one or more builders, selected from organic and inorganic builders. Examples of suitable inorganic builders are sodium sulfate or sodium carbonate or silicates, in particular sodium disilicate and sodium metasilicate, zeolites, sheet silicates, in particular those of the formula $\alpha$-$Na_2Si_2O_5$, $\beta$-$Na_2Si_2O_5$, and $\delta$-$Na_2Si_2O_5$, also fatty acid sulfonates, $\alpha$-hydroxypropionic acid, alkali metal malonates, fatty acid sulfonates, alkyl and alkenyl disuccinates, tartaric acid diacetate, tartaric acid monoacetate, oxidized starch, and polymeric builders, for example polycarboxylates and polyaspartic acid.

Examples of organic builders are especially polymers and copolymers. In one embodiment of the present invention, organic builders are selected from polycarboxylates, for example alkali metal salts of (meth)acrylic acid homopolymers or (meth)acrylic acid copolymers, partially or completely neutralized with alkali.

Suitable comonomers for (meth) are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 3,000 to 10,000 g/mol.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilic or hydrophobic monomer as listed below.

Suitable hydrophobic monomers are, for example, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. Polyalkylene glycols here may comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, amphoteric polymers can also be used as builders.

Inventive cleaning agents may comprise, for example, in the range from in total 10 to 50% by weight, preferably up to 20% by weight, of builder.

In one embodiment of the present invention, inventive cleaning agents according to the invention may comprise one or more cobuilders.

Inventive cleaning agents may comprise one or more antifoams, selected for example from silicone oils and paraffin oils.

In one embodiment of the present invention, inventive cleaning agents comprise in total in the range from 0.05 to 0.5% by weight of antifoam.

Inventive cleaning agents may comprise one or more enzymes. Examples of enzymes are lipases, hydrolases, amylases, proteases, cellulases, esterases, pectinases, lactases and peroxidases.

In one embodiment of the present invention, inventive cleaning agents may comprise, for example, up to 5% by weight of enzyme, preference being given to 0.1 to 3% by weight. Said enzyme may be stabilized, for example with the sodium salt of at least one $C_1$-$C_3$-carboxylic acid or $C_4$-$C_{10}$-dicarboxylic acid. Preferred are formates, acetates, adipates, and succinates.

In one embodiment of the present invention, inventive cleaning agents may comprise at least one zinc salt. Zinc salts can be selected from water-soluble and water-insoluble zinc salts. In this connection, within the context of the present invention, water-insoluble is used to refer to those zinc salts which, in distilled water at 25° C., have a solubility of 0.1 g/l or less. Zinc salts which have a higher solubility in water are accordingly referred to within the context of the present invention as water-soluble zinc salts.

In one embodiment of the present invention, zinc salt is selected from zinc benzoate, zinc gluconate, zinc lactate, zinc formate, $ZnCl_2$, $ZnSO_4$, zinc acetate, zinc citrate, $Zn(NO_3)_2$, $Zn(CH_3SO_3)_2$ and zinc gallate, preferably $ZnCl_2$, $ZnSO_4$, zinc acetate, zinc citrate, $Zn(NO_3)_2$, $Zn(CH_3SO_3)_2$ and zinc gallate.

In another embodiment of the present invention, zinc salt is selected from ZnO, ZnO·aq, $Zn(OH)_2$ and $ZnCO_3$. Preference is given to ZnO·aq.

In one embodiment of the present invention, zinc salt is selected from zinc oxides with an average particle diameter (weight-average) in the range from 10 nm to 100 μm.

The cation in zinc salt can be present in complexed form, for example complexed with ammonia ligands or water ligands, and in particular be present in hydrated form. To simplify the notation, within the context of the present invention, ligands are generally omitted if they are water ligands.

Depending on how the pH of mixture according to the invention is adjusted, zinc salt can change. Thus, it is for example possible to use zinc acetate or $ZnCl_2$ for preparing formulation according to the invention, but this converts at a pH of 8 or 9 in an aqueous environment to ZnO, $Zn(OH)_2$ or ZnO·aq, which can be present in non-complexed or in complexed form.

Zinc salt may be present in those inventive cleaning agents that are solid at room temperature. In such inventive cleaning agents zinc salts are preferably present in the form of particles which have for example an average diameter (number-average) in the range from 10 nm to 100 μm, preferably 100 nm to 5 μm, determined for example by X-ray scattering.

Zinc salt may be present in those inventive cleaning agents that are liquid at room temperature. In such inventive cleaning agents zinc salts are preferably present in dissolved or in solid or in colloidal form.

In one embodiment of the present invention, inventive cleaning agents comprise in total in the range from 0.05 to 0.4% by weight of zinc salt, based in each case on the solids content of the cleaning agent in question.

Here, the fraction of zinc salt is given as zinc or zinc ions. From this, it is possible to calculate the counterion fraction.

In one embodiment of the present invention, inventive cleaning agents are free from heavy metals apart from zinc compounds. Within the context of the present, this may be understood as meaning that inventive cleaning agents are free from those heavy metal compounds which do not act as bleach catalysts, in particular of compounds of iron and of bismuth. Within the context of the present invention, "free from" in connection with heavy metal compounds is to be understood as meaning that the content of heavy metal compounds which do not act as bleach catalysts is in sum in the range from 0 to 100 ppm, determined by the leach method and based on the solids content. Preferably, inventive cleaning agents has, apart from zinc, a heavy metal content below 0.05 ppm, based on the solids content of the formulation in question. The fraction of zinc is thus not included.

Within the context of the present invention, "heavy metals" are deemed to be all metals with a specific density of at least 6 g/cm$^3$ with the exception of zinc. In particular, the heavy metals are metals such as bismuth, iron, copper, lead, tin, nickel, cadmium and chromium.

Preferably, inventive cleaning agents comprise no measurable fractions of bismuth compounds, i.e. for example less than 1 ppm.

Inventive cleaning agents are excellent for cleaning hard surfaces and fibres.

The present invention is further illustrated by working examples.

General remarks: Nl: Norm liter, liters under normal conditions; Nm$^3$: norm cubic meter, cubic meter under normal conditions Starting Materials:
(A.1): trisodium salt of methylglycine diacetic acid (MGDA-Na$_3$)
Salt of fatty acid (B.1): sodium oleate
I. Manufacture of Spray Liquors
I.1 Manufacture of Spray Liquor SL.1

A vessel was charged with 17 kg of an aqueous solution of (A.1) (40% by weight). An amount of 67 g solid (B.1) was added. The spray liquor SL.1 so obtained was stirred vigorously and then heated to 70° C. and subjected to spray granulation.

I.2 Manufacture of Spray Liquor SL.2

A vessel was charged with 17 kg of an aqueous solution of (A.1) (40% by weight). An amount of 17 g solid (B.1) was added. The spray liquor SL.2 so obtained was stirred and then heated to 70° C. and subjected to spray granulation.

II. Spray Granulation
II.1 Spray Granulation of Spray Liquor SL.1

A cylindrical vessel with a perforated plate at the bottom, diameter of the cylinder: 148 mm, top lateral area 0.017 m$^2$, height: 40 cm, with zig-zag air classifier, commercially available as Glatt Lab System with Vario 3 Insert, was charged with 0.9 kg of solid MGDA-Na$_3$ spherical particles, diameter 350 to 1,250 μm, and 600 g of milled MGDA-Na$_3$ particles. An amount of 200 Nm$^3$/h of air with a temperature of 170° C. was blown from the bottom. A fluidized bed of MGDA-Na$_3$ particles was obtained. The above liquor SL.1 was introduced by spraying 6.7 kg of SL.1 (50° C.) per hour into the fluidized from the bottom through a two-fluid nozzle, absolute pressure in the nozzle: 5 bar. Granules were formed, and the bed temperature, which corresponds to the surface temperature of the solids in the fluidized bed, was 98 to 201° C.

After every 30 minutes, portions of solids were removed with an in-line discharge screw attached to the cylindrical vessel directly above the perforated plate. After such removal, an amount of 1 kg of granule remained in the fluidized bed. The solids removed were subjected to two sieving steps. Three fractions were obtained: coarse particles (diameter>1.25 mm), fines (diameter<0.355 mm), middle fraction (0.355 mm<diameter<1.25 mm). The coarse particles were milled using a hammer mill (Kinetatica Polymix PX-MFL 90D) at 4000 rpm (rounds per minute), 2 mm mesh. The powder so obtained was mixed with the fines and then altogether returned into the fluidized bed.

After 90 minutes of spray granulating a steady state was reached. The middle fraction was collected as inventive granule Gr.1. The residual moisture of Gr.1 was determined to be 10.5 to 11.0%, referring to the total solids content of the granule.

In the above example, hot air of 170° C. can be replaced by hot $N_2$ having a temperature of 170° C.

The yellowing behavior of Gr.1 was excellent.

10 g of the respective granule were mixed with 5 g Na-percarbonate and placed in a vial having a stopper with a approx. 5 mm hole to allow an exchange with the surrounding atmosphere. The vial was stored for 28 days in a climate-chamber at 35° C. and 70% humidity.

The discoloration of these stored mixtures was determined by measuring the b-value of the CIELAB color space (Elrepho measurement).

TABLE 1

Yellowing behavior of inventive granules and comparative granule

|  | Gr. 1 | Gr. 2 | C-Gr. 3 |
| --- | --- | --- | --- |
| MGDA content [% by weight] | 80.5 | 80.8 | 81.7 |
| Bulk density [g/l] | 904 | 877 | 800 |

The MGDA content refers to active matter and was determined by potentiometric $FeCl_3$ titration. The bulk density was determined according to DIN ISO 697-1984-01

The invention claimed is:

1. A process for making a powder or granule comprising:
   (A) at least one chelating agent selected from alkali metal salts of methyl glycine diacetic acid (MGDA), and
   (B) at least one alkali metal salt of a $C_{10}$-$C_{20}$ fatty acid, in a weight ratio of (A):(B) of from 40:1 up to 1,000:1, wherein said powder or granule contains at least 75% by weight of (A),
   wherein the process comprises:
   (a) mixing (A) and (B) in the presence of water, and
   (b) removing at least 55% of said water by spray-granulation in a fluidized bed or by spray drying using a gas with an inlet temperature of at least 125° C.

2. The process according to claim 1, wherein (A) is a trisodium salt of MGDA.

3. The process according to claim 1, wherein (B) is selected from salts of fatty acids with at least one carbon-carbon double bond per molecule.

4. The process according to claim 1, wherein (B) is selected from sodium and potassium salts of oleic acid, linoleic acid, palmitoleic acid, or α-linolenic acid.

5. The process according to claim 1, wherein step (a) is performed in a nozzle, immediately before or simultaneously with step (b).

6. The process according to claim 1, wherein step (b) is performed with a two-fluid nozzle.

7. The process according to claim 1, wherein the powder or granule has a bulk density of from about 850 to 950 g/l, as determined according to DIN ISO 697-1984-01.

8. The process according to claim 1, wherein the powder or granule has a bulk density of from about 850 to 920 g/l, as determined according to DIN ISO 697-1984-01.

9. The process according to claim 1, wherein the powder or granule has a bulk density of from about 875 to 910 g/l, as determined according to DIN ISO 697-1984-01.

* * * * *